(12) United States Patent
Yazaki et al.

(10) Patent No.: US 6,263,214 B1
(45) Date of Patent: Jul. 17, 2001

(54) METHOD FOR CONTROLLING ACTIVATION OF MOBILE STATION, AND MOBILE STATION USING THE METHOD

(75) Inventors: Hidetoshi Yazaki; Kouji Chiba, both of Yokohama; Hiroshi Kanto, Kawasaki; Isao Hirakodama, Yokosuka, all of (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/091,881

(22) PCT Filed: Feb. 13, 1998

(86) PCT No.: PCT/JP98/00590

§ 371 Date: Jun. 26, 1998

§ 102(e) Date: Jun. 26, 1998

(87) PCT Pub. No.: WO98/36546

PCT Pub. Date: Aug. 20, 1998

(30) Foreign Application Priority Data

Feb. 14, 1997 (JP) .................................................. 9-030079

(51) Int. Cl.⁷ ............................... H04Q 7/20; H04B 1/38
(52) U.S. Cl. ......................... 455/558; 455/435; 455/410; 455/411
(58) Field of Search ...................................... 455/435, 558, 455/410, 411, 418

(56) References Cited

U.S. PATENT DOCUMENTS

| | | | |
|---|---|---|---|
| 5,586,166 | * 12/1996 | Turban | 455/558 |
| 5,630,159 | * 5/1997 | Zancho | 709/221 |
| 5,835,857 | * 11/1998 | Otten | 455/410 |
| 5,854,976 | * 12/1998 | Garcia Aguilera et al. | 455/411 |
| 5,875,404 | * 2/1999 | Messiet | 455/558 |
| 5,913,175 | * 6/1999 | Pinault | 455/558 |

FOREIGN PATENT DOCUMENTS

| | | |
|---|---|---|
| 1086367A | 5/1994 | (CN) . |
| 1133667A | 10/1996 | (CN) . |
| 0586081A1 | 3/1994 | (EP) . |
| 0 727 129 | 8/1996 | (EP) . |
| 2711866 | 5/1995 | (FR) . |
| 2269512A | 2/1994 | (GB) . |
| 7-312630 | 11/1995 | (JP) . |
| 8-511144A | 11/1996 | (JP) . |
| 95/12293 | 5/1995 | (WO) . |
| WO 96/35304 | * 11/1996 | (WO) ............................... H04Q/7/32 |

* cited by examiner

*Primary Examiner*—Nay Maung
*Assistant Examiner*—Erika A. Gary
(74) *Attorney, Agent, or Firm*—Connolly Bove Lodge & Hutz LLP

(57) ABSTRACT

A subscriber information storing module is fixedly and internally housed within a mobile station, which is provided with an interface which permits an IC card storing subscriber information to be loaded. When a power supply is turned on, if a module is not loaded into the interface, subscriber information in the internally housed module is used to perform an activation processing for the mobile station. When an IC card is loaded into the interface, an examination is made to see if the subscriber number of the IC card and the subscriber number of the mobile station coincide, and if they coincide, the internally housed module is disabled, and subscriber information of the IC card is used.

8 Claims, 5 Drawing Sheets

METHOD FOR CONTROLLING ACTIVATION OF MOBILE STATION, AND MOBILE STATION USING THE METHOD

TECHNICAL FIELD

The present invention relates to a mobile station which performs a communication with a base station using a module (such as IC card, for example) storing subscriber information and a method of controlling the activation thereof.

THE PRIOR ART

The prior art includes a type of mobile station in which a subscriber information storing module is fixedly mounted therein and another type in which the subscriber information storing module is loaded into the mobile station in a physically detachable manner. The mobile station of the former type which internally houses the subscriber information storing module is not provided with a loader which permits another subscriber information storing module to be loaded therein from the exterior in a removable manner. On the other hand, the mobile station of the latter type in which a subscriber information storing module is loaded for use is not fixedly provided with a subscriber information storing module. Thus, a conventional mobile station adopted only one type which is either one of the types for mounting a subscriber information storing module.

A mobile station which is useable with any of standard memory modules (a so-called smart card internally housing a processor function and hereafter referred to as IC card) intended for the same purpose of use, but having different configurations is disclosed in British Patent Publication GB2269512. With this scheme, a precedence is previously given to a plurality of loaders (loading slots), and of a plurality of IC cards loaded, subscriber information is read from the IC card in the loading slot having the highest precedence for use in achieving a communication. This permits a plurality of subscribers to use the same mobile station. However, the mobile station cannot be used unless an IC card is loaded. It would then be convenient to have a mobile station which is fixedly provided with a module storing subscriber information for a particular subscriber and which is provided with at least one IC card loader so that the mobile station is also useable with an IC card.

As recognized, a network control center has a subscriber information memory, which is arranged as shown in FIG. 1, for example, so that a subscriber information memory 30 stores, in a manner corresponding to each subscriber ID given in a column 31a, a mobile station number, an optional service and a location registration in columns 31b, 31c, 31d, respectively. In its useable condition (standby condition or power on condition), the mobile station makes a location registration request to the network control center if visited cell information in a control channel signal which is received from the base station differs from visited cell information which was received previously, and the control center can inform an incoming call to the mobile station by registering a cell which is currently visited by the mobile station. The location registration request signal transmitted by the mobile station includes a subscriber identification information (subscriber number or telephone number) and a mobile station number. Upon receiving the location registration request signal, the control center matches the mobile station number in the subscriber information memory 30 which corresponds to the subscriber number against the received mobile station number, and if they coincide, it registers the cell number which the base station receiving the location registration request signal belongs. Therefore, when one who wishes to use the mobile station (not always the same as the registered subscriber for the mobile station) loads his IC card into the mobile station, the subscriber information of that user is read from the IC card by the mobile station and is used by the latter, thereby enabling the charging for the utilization of the network by the user.

Since the IC card can be loaded into any mobile station for use, it is necessary for the network to regard the IC card as associated with a mobile station which performs a call-origination/termination under the subscriber number of the IC card and which is positioned at the mobile station into which it is loaded for use. Accordingly, when a subscriber registers the use of an IC card under contract, the control center assigns a subscriber number and a mobile station number to the IC card and registers with the subscriber information memory 30 in a manner corresponding to the subscriber number of that subscriber. Because a single subscriber number is not allowed to have a plurality of mobile station numbers assigned simultaneously, if subsequent to the registration of the use of a mobile station by a subscriber, a request for the registration of another IC card is made using the same subscriber number, the mobile station number of the mobile station which is registered with the subscriber information memory 30 in the control center is updated to the mobile station number of the IC card.

When a mobile station fixedly and internally houses a subscriber information module (hereafter simply referred to as module), the subscriber information of an owner of the mobile station is previously written into the module. The subscriber information is recorded in the subscriber information storing memory 30 of the network in a manner corresponding to the subscriber number. If a subscriber other than the owner of the mobile station loads his IC card into the mobile station, the mobile station is enabled for communication by using the subscriber information in the IC card.

In the event that the owner of the mobile station (subscriber) desires that an IC card can be used with an arbitrary mobile station to perform a communication, if the same subscriber information is written into the IC card as in the internally housed module, it follows that the same mobile station number is given to two entities, the mobile station and the IC card. If then the owner of the mobile station loads his IC card into another subscriber's mobile station, the control center then receives the location registration request based on the same subscriber information from two mobile stations. A difficulty then arises that the control center cannot distinguish between the two mobile stations.

It is an object of the invention to provide a method of controlling the activation of a mobile station which permits a plurality of subscribers to use a common mobile station by means of respective IC cards and which permits a particular subscriber such as the owner of the mobile station, for example, to use the mobile station by means of either the IC card or an internally housed module, and a mobile station which uses the method.

SUMMARY OF THE INVENTION

A method of controlling the activation of a mobile station according to the invention comprises the steps of:
  (a) determining if an IC card is loaded into an interface;
  (b) in the event it is determined at step (a) that no IC card is loaded, using subscriber information in an internally housed module to enable a communication; and (c) in the event it is determined at step (a) that an IC card is loaded;
  (c-1) using subscriber information in the IC card to enable a communication,
  (c-2) determining if the subscriber number of the IC card coincides the subscriber number of the mobile station, and
  (c-3) disabling the module if the subscriber numbers coincide at step (c-2).

A mobile station according to the invention which uses subscriber information to achieve a radio communication with a base station comprises
  a subscriber information storing module fixedly and internally housed therein;
  an interface into which an IC card storing subscriber information is detachably loaded;
  control means responsive to the absence of an IC card loaded into the interface after a power supply is turned on for enabling a communication using the subscriber information in the subscriber information module and responsive to the presence of an IC card loaded into the interface for determining if a subscriber number in the subscriber information of the IC card coincides a subscriber number in the subscriber information within the module, disabling the module if they coincide and enabling a communication using the subscriber information of the IC card;
  and memory means for holding subscriber information which is used in an activation processing.

BEST MODES OF CARRYING OUT THE INVENTION

Figure 2:
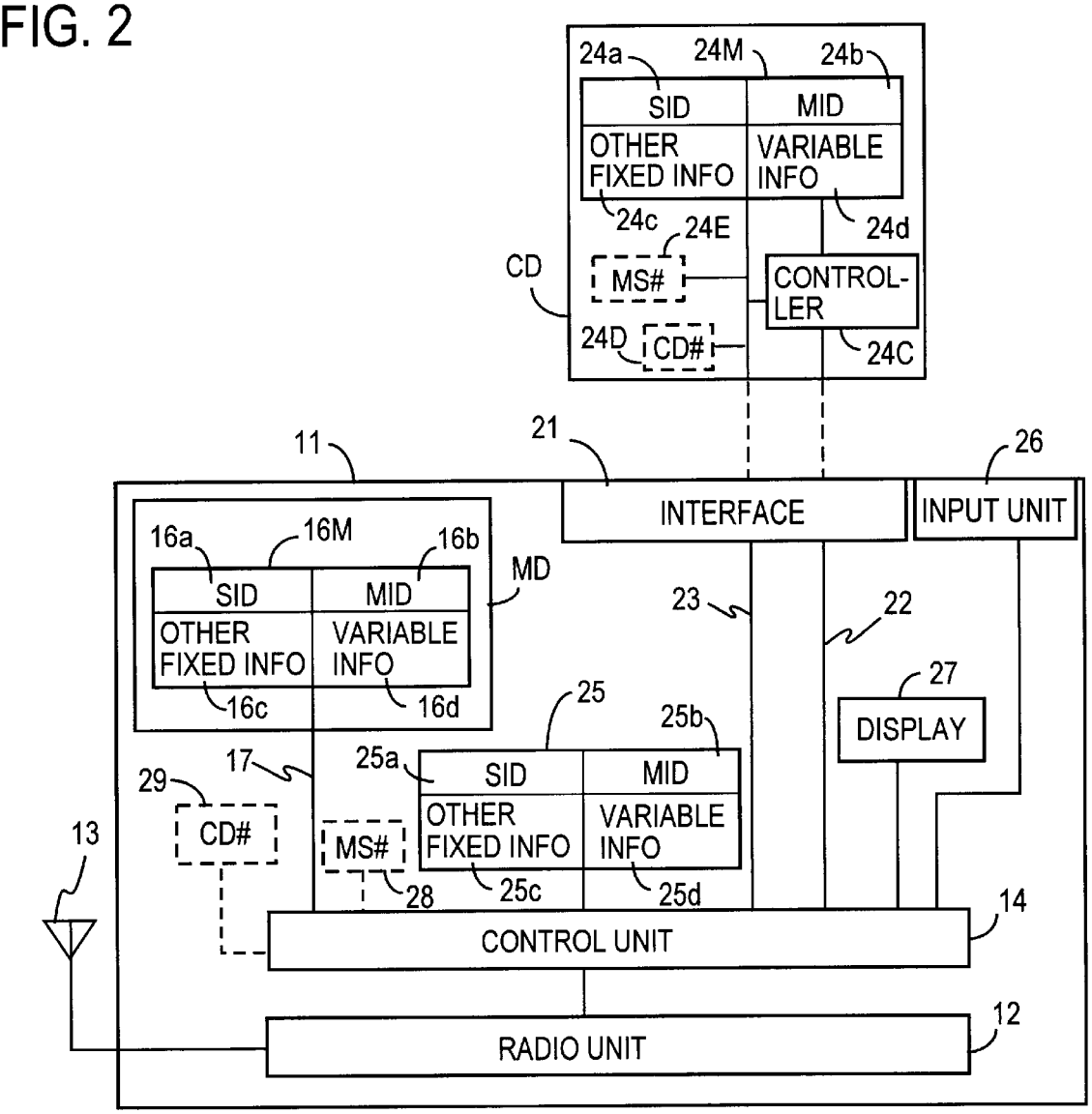
FIG. 2 is a block diagram showing a functional arrangement of a mobile station according to an embodiment of the invention.

FIG. 2 shows a mobile station according to an embodiment of the invention. A mobile station 11 includes a radio unit 12 which performs a radio communication with a base station (not shown) through an antenna 13. A control over the radio communication is made by a control unit 14. An audio signal section is omitted from illustration in this Figure. In accordance with the invention, a subscriber information storing module MD is fixedly provided within the mobile station 11. The subscriber information storing module MD stores a subscriber number, a mobile station number, an authentication key, network information, subscriber set-up information and the like, namely, information which is used in a communication processing. In addition, the mobile station 11 is normally provided with ROM 28 into which a product number MS# of the mobile station is written.

The subscriber number is a telephone number, for example, network information includes information representing a location (cell or zone) where a location registration is made previously, home network information as the subscriber has joined the network, roaming information and the like, and subscriber set-up information includes information such as optional service information indicating the availability of various optional services under contract, abridged dial data, memory dial data (telephone number versus peer entity name data) and the like. Network information and subscriber set-up information includes fixed information (such as home network information, roaming information, optional service information, for example) and variable information (such as location registration information, abridged dial data, memory dial data, for example). Subscriber number and mobile station number belong to the fixed information. In addition, a variety of such subscriber information include information which is always required to perform a communication (such as subscriber number, mobile station number, network information, for example) and information which is not always required to perform a communication, but which is useful to a user (such as abridged dial data, memory dial data, charge and time for transmission, for example).

The module MD has a subscriber information memory 16M, which includes regions 16a and 16b into which a subscriber number SID and a mobile station number MID, representing fixed information, are written, a region 16c into which other fixed information is written, and a region 16d into which variable information is written. The subscriber number (for example, telephone number) SID, the mobile station number MID, other fixed information and variable information and the like which are stored in the memory 16M of the module MD can be read by the control unit 14 through a signal line 17 to be written into corresponding regions 25a, 25b, 25c, 25d of a subscriber information memory 25 formed by a non-volatile memory and serving as a working memory in order to perform a communication with a base station using the subscriber information, to read desired information from the subscriber information or to compile the subscriber information.

The mobile station 11 is provided with an interface 21, into which a subscriber information storing IC card CD can be externally loaded in a detachable manner. Assembled on the IC card CD is a CPU which forms a controller 24C and an IC chip including a non-volatile memory which forms a subscriber information memory 24M, as shown in FIG. 2. Normally, the product number (or serial number) CD# of the IC card is recorded in ROM 24D. Also the subscriber information memory 24M of the IC card includes regions 24a and 24b into which the subscriber number SID and the mobile station number MID, both representing fixed information, are written, a region 24c into which other fixed information is written, and a region 24d into which variable information is written. Under a condition that the IC card CD is loaded into the interface 21, the control unit 14 feeds operating power to the IC card CD through a control line 22, and can read subscriber information from regions 24a, 24b, 24c, 24d of the memory 24M in the IC card CD for use in writing into corresponding regions 25a, 25b, 25c, 25d of the subscriber information memory 25 through a signal line 23.

The mobile station 11 is additionally provided with an input operating unit 26 as may be formed by push-button switches, and a display 27 for various information.

An activation controlling procedure according to the invention will be described with reference to FIG. 3. When the power supply of the mobile station 11 is turned ON (S1), step S0 which operates independently from the processing operations taking place at steps S2–S11 always monitors a change in the status of loading of the IC card in the interface 21 (loaded or removed), and whenever it detects a change in the status during any processing operations taking place at one of steps S2–S11, it causes the processing operation to be suspended by an interrupt, causing the operation to be returned to processing step S2. On the other hand, at step S1, an examination is made to see whether or not the IC card CD is loaded into the interface 21, and if it is not loaded, an examination is made to see if the module MD is operable at step S3. If it is operable, subscriber information in the module MD is loaded into the memory 25 at step S4. At step S5, the communication is enabled on the basis of the subscriber information, thus completing the activation. If it is found at step S3 that the module MD is inoperable, an indication requesting the loading of the IC card is displayed on the display 27 at step S6.

When it is determined at step S2 that the IC card CD is loaded into the interface 21, the operating power is fed to the IC card from the mobile station 11, and an examination is made to see if the IC card CD is activated at step S7. If it is activated, subscriber information is read from the memory 24M within the IC card and is loaded into the memory 25 at step S8. An examination is then made at step S9 to see if the acquisition and update of the subscriber information have been properly made, namely, if the subscriber information is what can be normally acquired and represents qualified information which is expected by the mobile station 11. If the information is normal, a comparison is made at step S10 to see if the subscriber number (for example, telephone number) SID within the module MD coincides the subscriber number SID which is taken from the IC card CD. If they do not coincide, the communication is enabled on the basis of the subscriber information from the IC card which is loaded into the memory 25, thus completing the activation. Specifically, this means that in this instance, a subscriber having a different number from the subscriber number SID of the owner of the mobile station which is written into the module MD is using the mobile station.

When it is determined at step S10 that the subscriber numbers coincide, in accordance with the invention, the module MD is disabled at step S11, and the communication is enabled using the subscriber information which is taken from the IC card into the memory 25 at step S5, thus completing the activation. Thus, the execution of the processing shown at step S11 implies that from now on, the owner of the mobile station does not use his subscriber information within the module MD, but will load his IC card into the mobile station for performing a communication. Accordingly, the call-termination to that subscriber will take place to a mobile station (which is not always the mobile station owned by him) in which the IC card of that subscriber is loaded.

When it is found at step S7 that the IC card is not activated or when normal subscriber information could not have been taken from the IC card or the memory 24M (meaning that the information is not normal) at step S9, the operation transfers to step S6 where a display requesting the loading of the IC card is made.

In this manner, in accordance with the invention, if the subscriber number of the IC card coincides the subscriber number within the module MD of the mobile station, the module MD is disabled, thus preventing the location registration from occurring separately for the mobile station and the IC card which share the same subscriber number.

Figure 3:
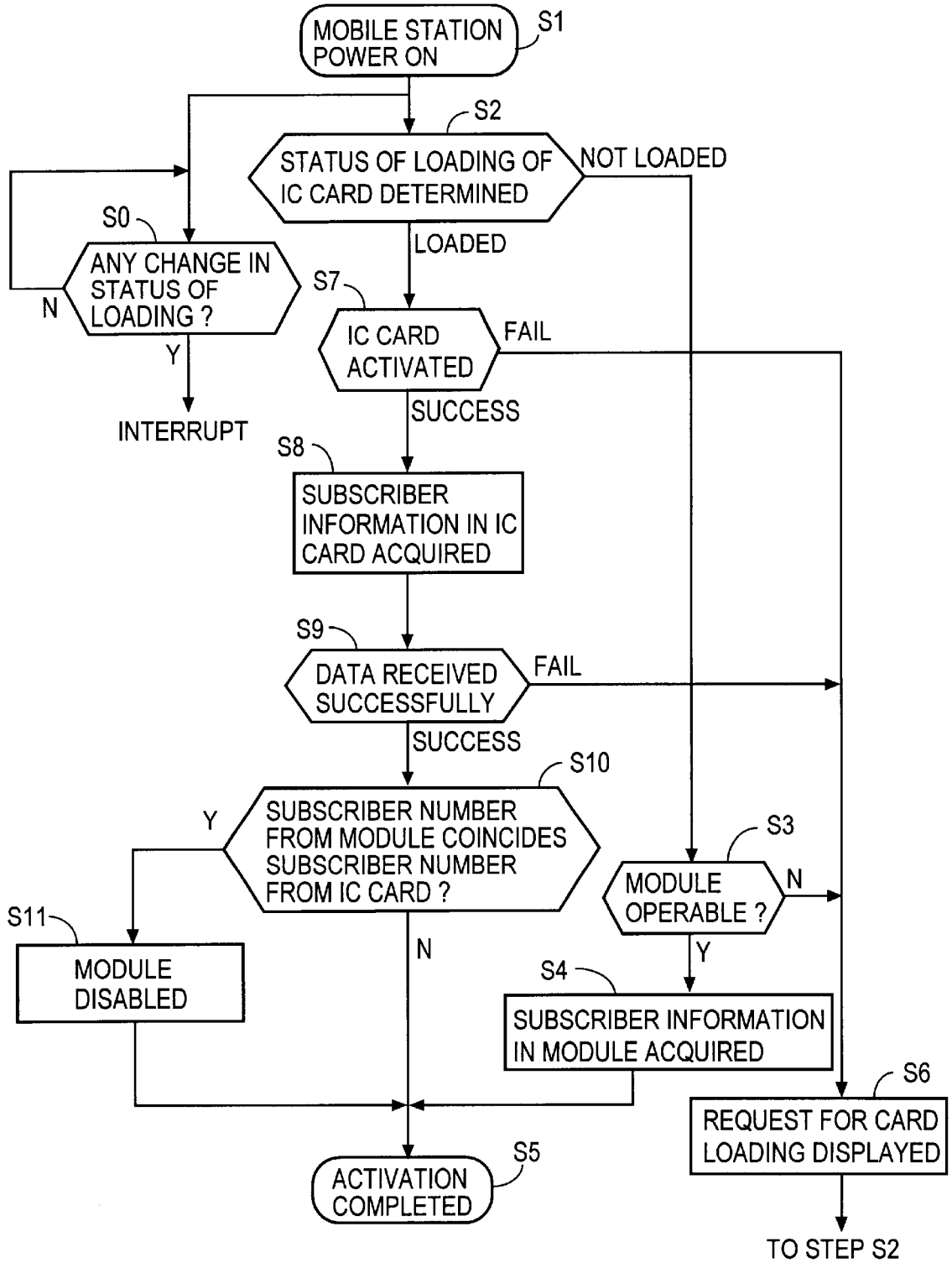
FIG. 3 is a flow diagram of an activation processing procedure according to a first embodiment of the invention.
Figure 4:
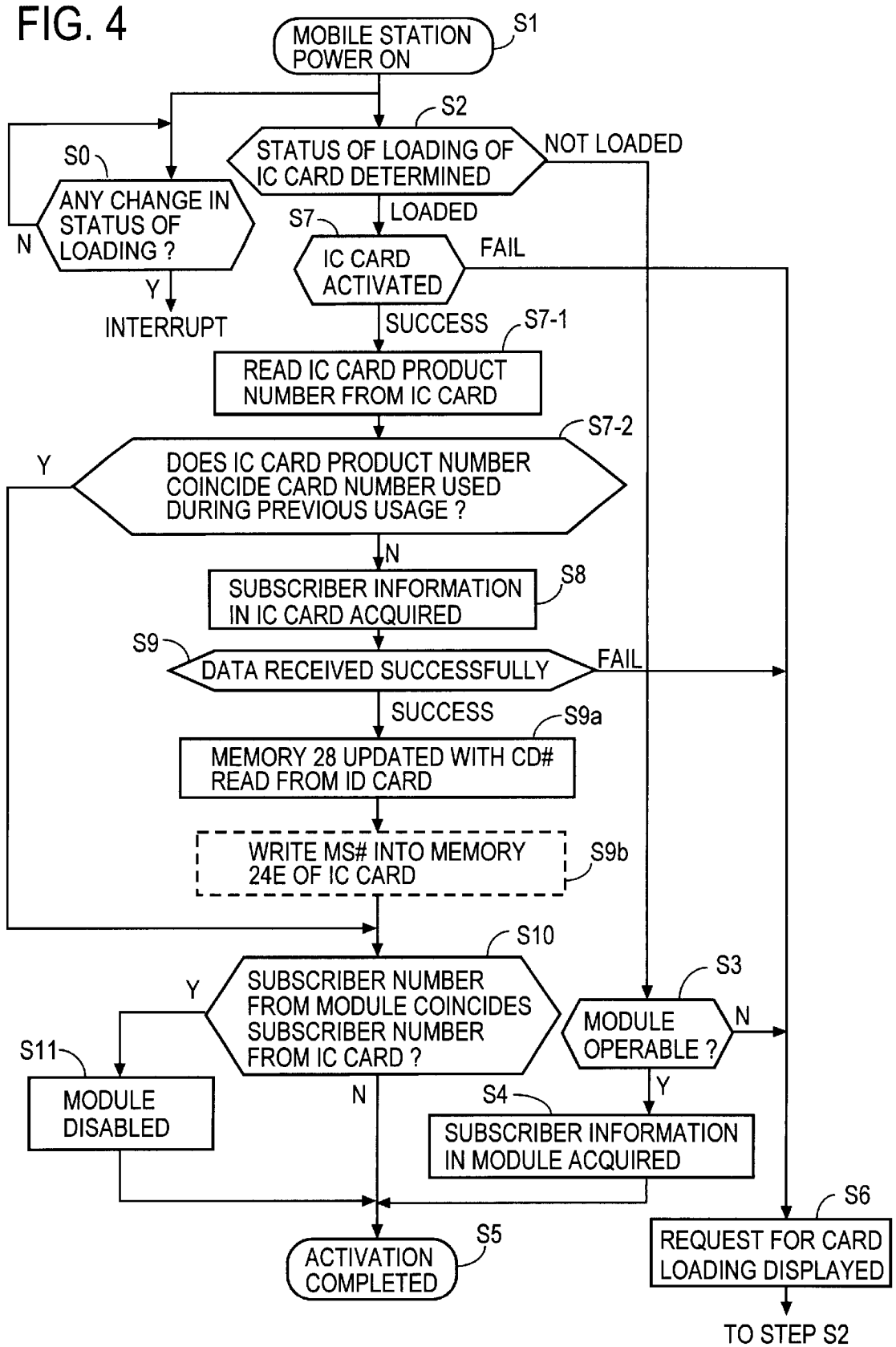
FIG. 4 is a flow diagram of an activation processing procedure according to a second embodiment of the invention.

In the embodiment of FIG. 3, when the same IC card as previously used is loaded, information which is taken during the previous usage is directly used, in place of taking the subscriber information from the IC card into the working memory 25 anew, thus shortening the time interval required for the activation and achieving a saving in the power dissipation. In this instance, a non-volatile memory 29 which stores the product number CD#, for example, of the IC card may be provided as shown in broken lines in FIG. 2, and the processing operation in the mobile station takes place according to a processing flow as shown in FIG. 4, for example. The processing of the activation of the mobile station in this instance takes place in a manner described below, by providing steps S7-1, S7-2 between steps S7 and S8 in FIG. 3 and providing step S9a between steps S9 and S10.

When the IC card is successfully activated at step S7, the IC card product number CD# stored in the ROM 24D in the IC card is read at step S7-1, and is compared against the product number CD# of the IC card CD which was used previously and which is stored in the memory 29 at step S7-2. If they coincide, the subscriber information which was used previously and which is stored in the working memory 25 may be used and a reading of the subscriber information from the IC card CD (step S8) is not made. Accordingly, the operation transfers to step S10 where the coincidence between the subscriber numbers SID's is examined. If it is found at step S7-2 that the IC card product number CD# does not coincide the product number CD# of the IC card which was used previously and which is stored in the memory 29, the operation transfers to step S8 where entire subscriber information (information in regions 24a–24d) is read from the memory 24M of the IC card and written into the working memory 25. When it is determined at next step S9 that the acquisition of the subscriber information has taken place properly, the product number CD# of the IC card which is taken at step S7-1 is used to update the memory 29 at step S9a, the operation subsequently transferring to step S10. The remaining processing operation is similar as mentioned above in connection with FIG. 3, and therefore will not be described. While an example using the IC card product number has been described in the foregoing description, there is no particular significance in using the product number, and any distinct number or name which is given distinctively to the IC card may be used.

In the embodiment of FIG. 3, by providing a mobile station product number memory 24E formed by a non-volatile memory within the IC card CD, as shown in broken lines, a record may be made that this IC card CD has been used in this mobile station by writing the mobile station product number MS# read from the ROM 28 of the mobile station 11 into the memory 24E of the IC card at step S9b which follows step S9a, as indicated in broken lines, when data acquisition from the IC card which takes place at step S9 in FIG. 4 is successful. In this instance, in addition to the coincidence between the IC card product numbers CD#'s, the coincidence of the product number MS#, read out from the memory 24E in the IC card, of the mobile station into which the IC card was loaded previously, with the mobile station product number MS# which is stored in ROM 28 of the mobile station 11 may be added to the requirements for coincidence at step S7-2, so that the operation transfers to step S10 when the both requirements are satisfied.

During the examination of the coincidence between the IC card product number CD# stored in ROM 24 of the loaded IC card and the product number CD# of the IC card which was used previously and has been stored in the memory 29 and the coincidence between the mobile station product number MS# which is written into the memory 24E of the IC card and the mobile station product number MS# which is stored in ROM 28, both taking place at processing step S7-2 in FIG. 4, the following four cases may yield:

(a) The coincidence between the IC card product numbers CD#'s means that the IC card which is currently loaded into the mobile station is the same as that which was used previously, and the coincidence between the mobile station product numbers MS#'s means that the mobile station into which this IC card was used previously is the present mobile station. Accordingly, when the both examinations proved to be the coincidence, it may be estimated that the subscriber information stored in the working memory 25 is entirely the same as the subscriber information stored in the IC card. In this instance, there is no need to read the subscriber information from the IC card and to write it into the working memory 25.

(b) In the event the coincidence between the IC card product numbers CD#'s is successful, but the mobile manufacturing station numbers MS#'s failed to coincide, this means that the loaded IC card remains the same as the IC card which was used in this mobile station previously, but that the IC card was loaded and used in a mobile station other than the present mobile station before it is loaded into and used in the present mobile station currently. Accordingly, of the subscriber information which is currently stored in the work memory 25, it may be estimated that fixed information remains the same as fixed information stored in the loaded IC card, but there remains the possibility that variable information may have been modified when the IC card was loaded into and used in another mobile station during the previous usage. In this instance, only variable information may be read from the IC card and is used to update variable information in the region 24d of the working memory 25 while fixed information stored in the region 25c may be used. In addition, after updating variable information, it is necessary to overwrite the memory 24E of the IC card with the mobile station product number MS# of the mobile station 11.

(c) In the event the IC card product numbers CD#'s fail to coincide, but the coincidence between the mobile station product numbers MS#'s is successful, this means that the IC card which is currently loaded is separate from the IC card which was loaded during the previous usage, but that this IC card was loaded into and used in the present mobile station during the second previous usage. In this instance, because the loaded IC card and the IC card which was loaded during the previous usage have different subscriber numbers, the subscriber information are obviously different. Accordingly, it is necessary to read the entire subscriber information from the IC card which is currently loaded and to write it into the working memory 25 in order to update it. It is also necessary to overwrite the memory 24E of at least one IC card with the mobile station product number MS#.

(d) When both the IC card product numbers CD#'s and the mobile station product numbers MS#'s fail to coincide, this indicates that the IC card which is currently loaded and the IC card which was loaded during the previous usage are separate from each other, and that the IC card was loaded into and used in another mobile station during a previous usage. Consequently, it is also necessary in this instance to read the entire subscriber information from the loaded IC card and to write it into the memory 25 and to update the memory 24E with the mobile station product number of the mobile station 11.

Of the four cases mentioned above, the processing operation required for the paragraph (c) can be replaced by the processing operation for the paragraph (d). Accordingly, in consideration of the four cases mentioned above, an invoking procedure as shown in FIG. 5 may be used. The processing procedure shown in FIG. 5 comprises steps S7-2a, S7-2b, S7-2c and S8'which are substituted for steps S7-2 and S8 shown in FIG. 4, and step S9c in FIG. 5 which comprises a combination of steps S9a and S9b shown in FIG. 4. Only these modified steps will be described below.

At step S7-1, the IC card product number CD# is read from ROM 24D of the IC card, and is examined to determine if it coincides with the product number CD# of the IC card which was used previously and has been stored in the memory 29 at step S7-2a. If the product numbers do not coincide, this corresponds to the case (c) or (d). Accordingly, the operation transfers to step S8 where the entire subscriber information within the memory 24M of the IC card CD is read to update information stored in the memory 25. If it is found at step S7-2a that the IC card product number CD# coincides with the IC card product number CD# which is stored in the memory 29, the mobile station product number MS# is read from the memory 24E of the IC card at step S7-2b, and is compared against the mobile station product number MS# which is stored in ROM 28 in the mobile station 11 at step S7-2c. If the product numbers coincide, the operation transfers to step S10. If they do not coincide, variable information which is stored in the region 24d of the memory 24M of the IC card is read and is used to update information stored in the region 25d of the memory 25 at step S8', and the operation then transfers to step S9. If data from the IC card is successfully received at step S9, the IC card product number CD# within the memory 29 is updated by the IC card product number which is read, and the mobile station number MS# in ROM 28 is used to update the mobile station product number in the memory 24E of the IC card at step S9c, and the operation then transfers to step S10. In other respects, the processing operation remains similar to that shown in FIG. 4. In the above description, an example using the mobile station product number is given, but there is no particular significance in using the product number, and any distinct number or name which is given distinctively to the mobile station may be used.

Figure 1:
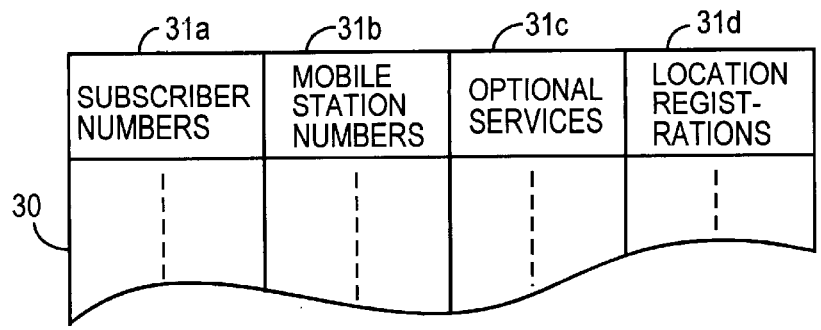
FIG. 1 is a diagram showing the construction of a subscriber information memory of a network control center.
Figure 5:
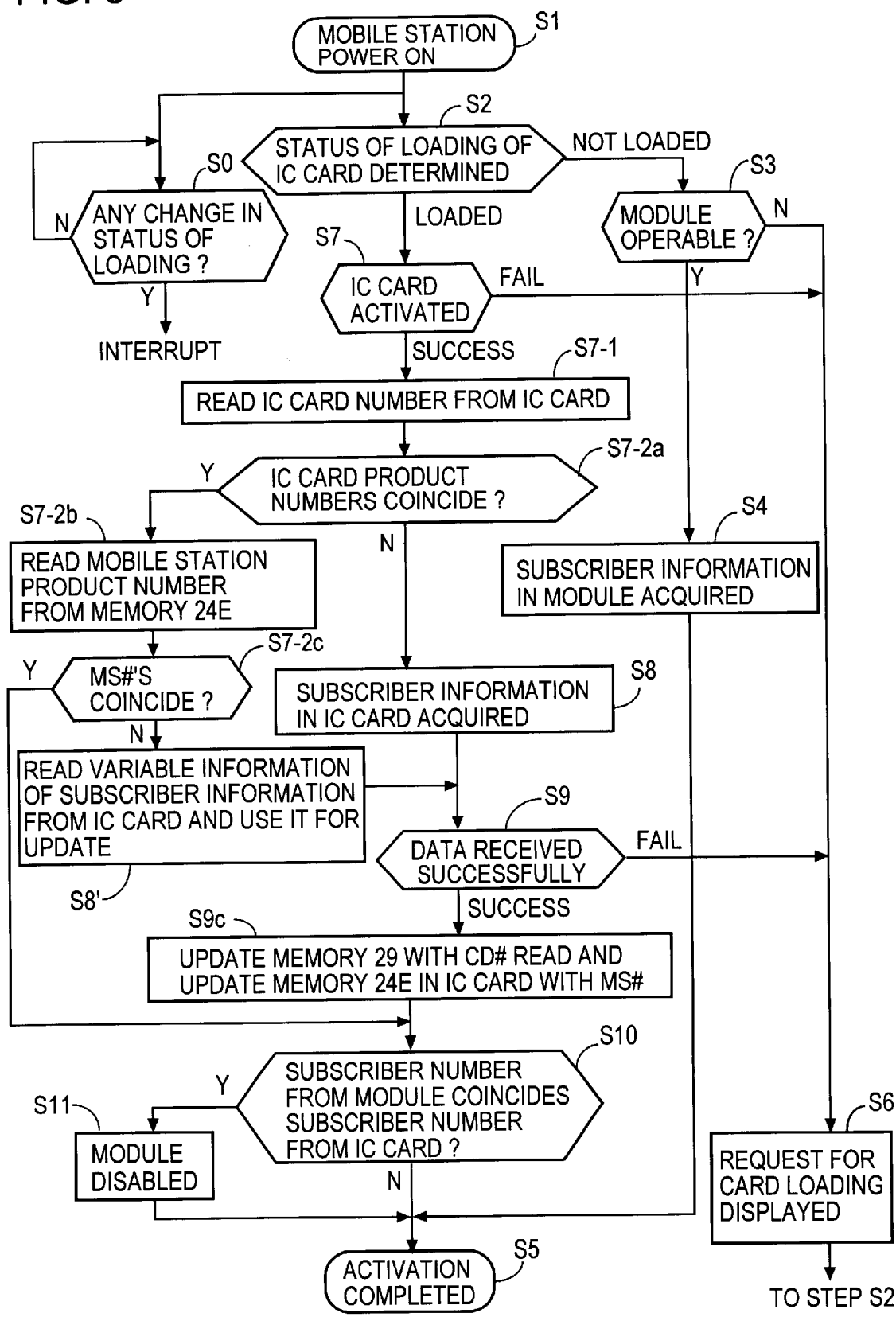
FIG. 5 is a flow diagram of an activation processing procedure according to a third embodiment of the invention.

In the embodiments shown in FIGS. 3, 4, and 5, it has been shown that in the event the subscriber who has registered a mobile station additionally registers the use of an IC card, the loading of that IC card disables the internally housed module MD, thus preventing the assignment of the same mobile station number to two entities, the mobile station and the IC card. However, if after registering the use of a mobile station, the subscriber registers the use of an IC card using the same subscriber number, the module MD remains operable until the IC card having that subscriber number is loaded into the mobile station. If the mobile station into which no IC card is loaded remains powered on, a location registration request will be transmitted on the basis of the subscriber information within the module MD each time the mobile station detects a change in the visited cell. In this instance, since the mobile station number which is registered in the subscriber information memory 30 (refer FIG. 1) in the network control center in a manner corresponding to the subscriber number has already been updated to the mobile station number which is assigned to the IC card, it does not coincide with the mobile station number which is received from the mobile station. Accordingly, the control center rejects the location registration request, transmitting a location registration reject signal based on the authentication NG to the mobile station. In order to eliminate a situation that prevents the location registration as early as possible, a processing operation shown in FIG. 6 may be performed with the completion of activation step S5 in FIG. 3, 4 or 5, for example.

Thus, it is assumed that the power supply is turned on when no IC card is loaded into the mobile station, and that the activation has been completed on the basis of the subscriber information in the module MD (step S5). Upon completion of the activation, it is in a standby condition, and upon detecting a change in the visited cell, the subscriber number SID and the mobile station number MID in the working memory 25 are transmitted as a location registration request signal to the control center at step S12. Subsequently, it is determined at step S13 whether there has been a received signal within a given time interval. If there is no received signal, a failure of communication with the center is determined, returning to step S12 where the location registration request signal is transmitted again. If there is a received signal at step S13, it is determined at step S14 if the received signal represents a location registration accept signal. If YES, the operation returns to the standby condition of step S5. If it is found at step S14 that the received signal is not the location registration accept signal, it is determined at step S15 if the received signal is a location registration reject signal based on the authentication NG. If YES, the module MD is disabled at step S16, and the operation returns to step S2. If it is determined at step S15 that the received signal is not the location registration reject signal which is based on the authentication NG, it is determined at step S17 that it represents a location registration reject signal other than by the authentication NG signal. In such instance, the inapplicability of the mobile station is indicated at step S18. If it is determined at step S17 that the received signal is not the location registration reject signal other than by the authentication NG, the operation returns to step S12.

Figure 6:
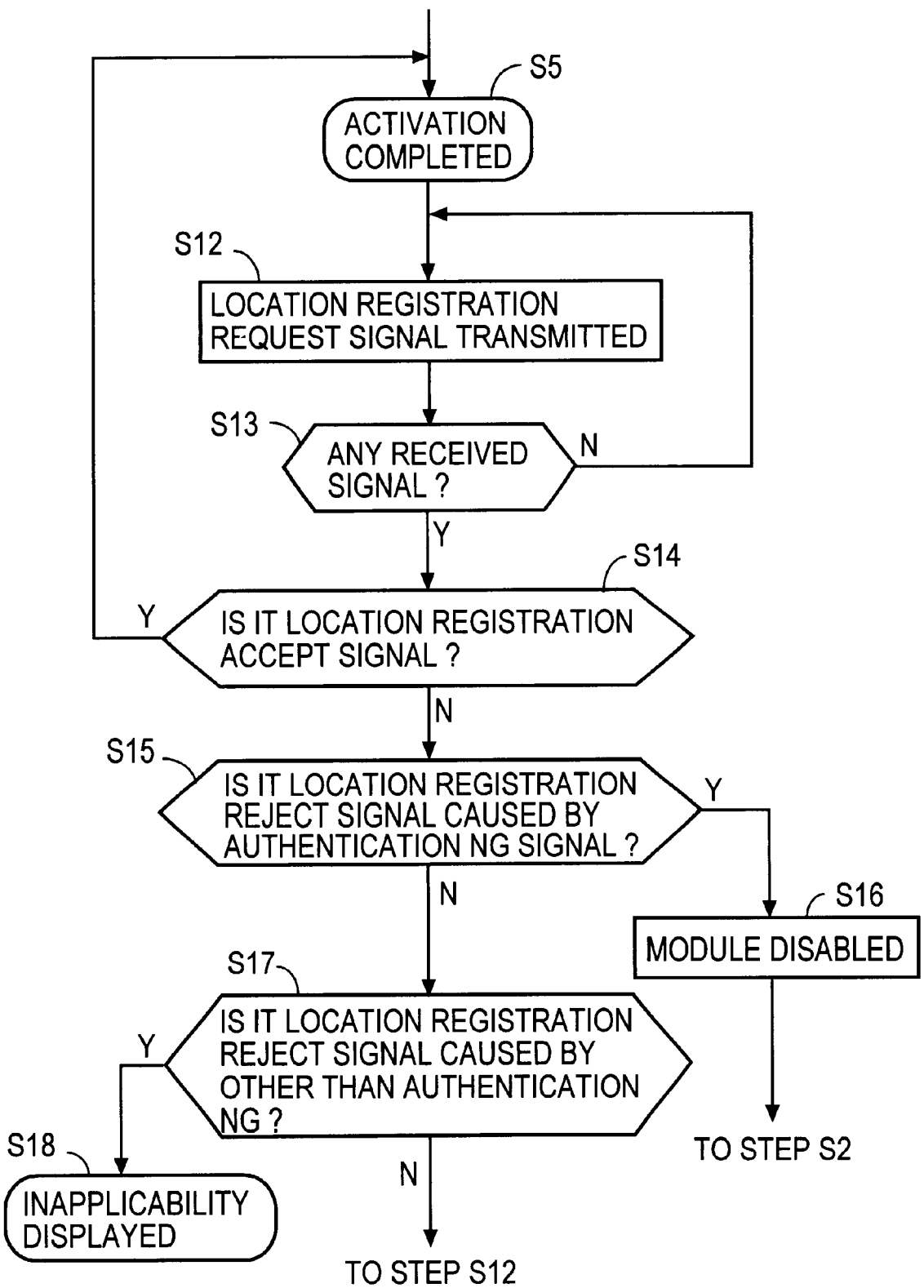
FIG. 6 is a flow diagram of an activation processing procedure according to a modification of the invention.

When the processing of FIG. 6 is executed, in the event the IC card is registered with the center using the same subscriber number as the mobile station, the mobile station number is updated, if the activation of the mobile station 11 has been completed on the basis of the subscriber information in the internally housed module (step S5) and, the location registration reject signal based on the authentication NG which is transmitted from the control center as a result of the execution of steps S12–S16 is received, thus resulting in the module being disabled and preventing a situation that the same subscriber member is concurrently used in two entities, the mobile station and the IC card, in order to enable a communication.

A solution of the problem that both the mobile station and the IC card are registered using the same subscriber number has been described above in connection with FIG. 6. However, the processing of FIG. 6 is also applicable to a similar problem which arises when the subscriber registers a second IC card additionally using the same subscriber number. In this instance, when the older IC card is loaded into the mobile station, which is then invoked, the control center transmits the location registration reject signal based on the authentication NG in response to the location registration request at step S12, whereby steps S13, S14 and S15 are executed, and the loaded IC card module may be made inapplicable at step S16.

In each of the embodiments described above, a loading of a single IC card into a mobile station has been described. However, the mobile station 11 may be provided with a plurality of interfaces 21 to permit a plurality of subscribers to load his IC card, and the mobile station may be invoked on the basis of the subscriber information of an IC card which is selected according to a predetermined precedence.

EFFECTS OF THE INVENTION

As described, in accordance with the invention, a module storing subscriber information is fixedly and internally housed within the mobile station, and an IC card storing subscriber information can be detachably loaded into the mobile station. In this manner, a choice between using the internally housed module and using the IC card is allowed to a registrant of the mobile station. However, in the event the registrant of the mobile station has chosen to use the IC card which is registered by using the same subscriber number, the internally housed module is disabled, thus permitting the problem of a double use of the subscriber number to be avoided.

What is claimed is:

1. A mobile station which uses subscriber information to achieve a radio communication with a base station, comprising:

a subscriber information storing module fixedly and internally housed therein;

an interface into which an IC card storing subscriber information is detachably loaded;

control means responsive to the absence of an IC card loaded into the interface after a power supply is turned on for enabling a communication using the subscriber information in the subscriber information module and responsive to the presence of an IC card loaded into the interface for determining if a subscriber number in the subscriber information of the IC card coincides a subscriber number in the subscriber information within the module, permanently disabling the module if they coincide and enabling a communication using the subscriber information of the IC card;

and memory means for holding the subscriber information which is used in an activation processing.

2. A mobile station according to claim 1, further comprising a used IC card memory into which the distinct number of a used IC card is written, the IC card being provided with an IC card number memory which maintains the IC card distinct number, the control means including means for determining if the IC card distinct number read from the IC card number memory of the IC card coincides with the IC card distinct number which is stored in the used IC card memory, means for using the subscriber information which was used previously and has been stored in the memory means to enable a communication if the determining means determines that the IC card distinct numbers coincide, means operative to read the subscriber information of the IC card to update the entire subscriber information in the memory means and to use the updated subscriber information to enable a communication if the determining means determines that the IC card distinct numbers do not coincide, and means for writing the mobile station distinct number which is stored in the mobile station number memory into the used mobile station number memory of the IC card.

3. A mobile station according to claim 1 in which the IC card is provided with an IC card number memory which maintains the IC card distinct number and a used mobile station memory which updates and maintains the mobile station distinct number of a mobile station being used and in which the mobile station is provided with a used IC card memory which updates and maintains the distinct number of an IC card being used and a mobile station number memory which maintains the mobile station distinct number of the mobile station;

said control means comprising means for determining if the IC card distinct number read from the IC card number memory coincides with the distinct number of an IC card which was used previously and has been stored in the used IC card memory and determining if the mobile station distinct number read from the used mobile station memory of the IC card coincides with the mobile station distinct number which is stored in the mobile station number memory, means for using the subscriber information which was used previously and has been stored in the memory means to enable a communication in the event the determining means determines that the IC card distinct numbers coincide and the mobile station distinct numbers coincide, means for reading variable information of the subscriber information of the IC card to update variable information in the subscriber information in the memory means, using the updated subscriber information to enable a communication, and writing the mobile station distinct number which is stored in the mobile station number memory into the used mobile station number memory of the IC card in the event the determining means determines that the IC card distinct numbers coincide while the mobile station distinct numbers do not coincide, and means for reading the subscriber information of the IC card to update information in the memory means, using the updated subscriber information to enable a communication, updating the used IC card memory with the IC card distinct number which is read from the IC card number memory of the IC card, and updating the used mobile station number memory of the IC card with the mobile station distinct number which is stored in the mobile station number memory in the event the determining means determines that the IC card distinct numbers do not coincide.

4. A mobile station according to claim 1 in which the control means comprises means for transmitting a location registration request based on the subscriber information which was used in a set-up, determining if a location registration accept signal or a location registration reject signal based on an authentication NG signal has been received, and disabling the module if the location registration reject signal based on the authentication NG has been received.

5. A method of controlling the activation of a mobile station, wherein said mobile station includes an internally housed module storing subscriber information, memory means holding subscriber information to be used and an interface into which an IC card storing subscriber information is loaded, and wherein the IC card is provided with an IC card number memory which maintains an IC card distinct number, the mobile station is provided with a used IC card memory which updates and maintains the distinct number of an IC card used, and the mobile station performs a radio communication with a base station using the subscriber information, said method comprising the steps of:

(a) determining if an IC card is loaded into the interface;
(b) in the event it is determined at step (a) that no IC card is loaded, using subscriber information in the module to enable a communication; and
(c) in the event it is determined at step (a) that an IC card is loaded;
  (c-1) using subscriber information in the IC card to enable a communication by:
    (c-1-1) determining if the IC card distinct number which is read from the IC card number memory coincides with the distinct number of the IC card which was used previously and has been stored in the used IC card memory,
    (c-1-2) in the event the IC card distinct numbers coincide at step (c1-1), using the subscriber information which was used previously and has been stored in the memory means to enable a communication,
    (c-1-3) in the event the IC card distinct numbers do not coincide at step (c-1-1), reading the subscriber information from the IC card to update information within the memory means and using the updated subscriber information to enable a communication,
  (c-2) determining if the subscriber number of the IC card coincides with the subscriber number of the mobile station, and
  (c-3) permanently disabling the module if the subscriber numbers coincide at step (c-2).

6. A method of controlling the activation of a mobile station according to claim 5 in which the step (b) includes the steps of:
(b-1) determining if subscriber information in the module is applicable,
(b-2) in the event it is determined at step (b-1) that the module subscriber information is applicable, using the subscriber information in the module to enable a communication,
(b-3) in the event it is determined at step (b-1) that the subscriber information in the module is not applicable, returning to step (a).

7. A method of controlling the activation of a mobile station, wherein the mobile station includes an internally housed module storing subscriber information, memory means holding subscriber information to be used, and an interface into which an IC card storing subscriber information is loaded, wherein the IC card is provided with an IC card number memory which maintains an IC card distinct number and a used mobile station memory which updates and maintains the mobile station distinct number of a used mobile station, and wherein the mobile station is provided with a used IC card memory which updates and maintains the distinct number of a used IC card and a mobile station distinct number memory which maintains the mobile station distinct number of the mobile station, and the mobile station performs a radio communication with a base station using the subscriber information, said method comprising the steps of:

(a) determining if an IC card is loaded into the interface;
(b) in the event it is determined at step (a) that no IC card is loaded, using subscriber information in the module to enable a communication; and
(c) in the event it is determined at step (a) that an IC card is loaded;
  (c-1) using subscriber information in the IC card to enable a communication, by
    (c-1-1) determining if the IC card distinct number read from the IC card number memory coincides with the distinct number of an IC card which was used previously and has been stored in the used IC card memory and determining if the mobile station distinct number read from the used mobile station memory of the IC card coincides with the mobile station distinct number which is stored in the mobile station distinct number memory,
    (c-1-2) in the event the IC card distinct numbers coincide and the mobile station distinct numbers coincide at step (c-1-1), using the subscriber information which was used previously and has been stored in the memory means to enable a communication, (c-1-3) in the event the IC card distinct numbers coincide while the mobile station distinct numbers do not coincide at step (c-1-1), reading variable information of the subscriber information of the IC card and using it to update variable information of the subscriber information in the memory means, using the updated subscriber information to enable a communication, and writing the mobile station distinct number stored in the mobile station number memory into the used mobile station number memory of the IC card, and (c-1-4) in the event the IC card distinct numbers do not coincide at step (c-1-1), reading the subscriber information of the IC card and using it to update information within the memory means, using the updated subscriber information to enable a communication, updating the used IC card memory with the IC card distinct number read from the IC card number memory of the IC card, and updating the used mobile station number memory of the IC card with the mobile station distinct number which is stored in the mobile station number memory, (c-2) determining if the subscriber number of the IC card coincides with the subscriber number of the mobile station, and (c-3) permanently disabling the module if the subscriber numbers coincide at step (c-2).

8. A method of controlling the activation of a mobile station according to claim 7, further comprising the steps of:

(d) transmitting a location registration request on the basis of the subscriber information which is used in a set-up;

(e) determining if a location registration accept signal has been received or a location registration reject signal based on an authentication NG signal has been received; and (f) in the event the location registration reject signal based on the authentication NG has been received, disabling the module.

* * * * *